(12) United States Patent
Kale et al.

(10) Patent No.: US 11,947,359 B2
(45) Date of Patent: Apr. 2, 2024

(54) INTELLIGENT LIDAR SENSORS FOR AUTONOMOUS VEHICLES

(71) Applicant: Micron Technology, Inc., Boise, ID (US)

(72) Inventors: Poorna Kale, Folsom, CA (US); Robert Richard Noel Bielby, Placerville, CA (US)

(73) Assignee: Micron Technology, Inc., Boise, ID (US)

( * ) Notice: Subject to any disclaimer, the term of this patent is extended or adjusted under 35 U.S.C. 154(b) by 596 days.

(21) Appl. No.: 16/791,900

(22) Filed: Feb. 14, 2020

(65) Prior Publication Data

US 2021/0255637 A1 Aug. 19, 2021

(51) Int. Cl.
| | | |
|---|---|---|
| G05D 1/02 | (2020.01) | |
| G01S 7/48 | (2006.01) | |
| G01S 7/4865 | (2020.01) | |
| G01S 17/89 | (2020.01) | |
| G05B 13/02 | (2006.01) | |
| G05D 1/00 | (2006.01) | |
| G06F 17/16 | (2006.01) | |
| G06N 3/049 | (2023.01) | |
| G06N 3/065 | (2023.01) | |
| G06N 3/08 | (2023.01) | |

(52) U.S. Cl.
CPC ......... *G05D 1/0248* (2013.01); *G01S 7/4802* (2013.01); *G01S 7/4865* (2013.01); *G01S 17/89* (2013.01); *G05B 13/027* (2013.01); *G06F 17/16* (2013.01); *G06N 3/049* (2013.01); *G06N 3/065* (2023.01); *G06N 3/08* (2013.01)

(58) Field of Classification Search
CPC .................................................. G05D 1/0248
See application file for complete search history.

(56) References Cited

U.S. PATENT DOCUMENTS 9,847,124 B2   12/2017 Hu et al.
10,421,453 B1 *  9/2019 Ferguson ........ B60W 60/00274
(Continued)

FOREIGN PATENT DOCUMENTS

GB   2536043 A *  9/2016 ............. G01S 13/86
GB   2597070 A *  1/2022 ............... H04K 3/82
(Continued)

OTHER PUBLICATIONS

Shayer, Oran, et al., Learning Discrete Weights Using the Local Reparameterization Trick, Cornell University, (https://arxiv.org/abs/1710.07739)(Feb. 2, 2018)(hereinafter "Shayer") (Year: 2018).*

(Continued)

*Primary Examiner* — Jean Paul Cass
(74) *Attorney, Agent, or Firm* — Greenberg Traurig

(57) ABSTRACT

Systems, methods and apparatuses of lidar sensors of autonomous vehicles. A lidar sensor can include: a memory configured to store a lidar image and an Artificial Neural Network (ANN); an inference engine configured to use the (ANN) to analyze the lidar image and generate inference results; and a communication interface coupled to a computer system of a vehicle to implement an advanced driver assistance system to operate the controls according to the inference results and a sensor data stream generated by sensors configured on the vehicle.

20 Claims, 10 Drawing Sheets

(56) References Cited

U.S. PATENT DOCUMENTS

| | | | |
|---|---|---|---|
| 11,351,991 B2* | 6/2022 | Ghafarianzadeh | B60W 30/09 |
| 11,378,965 B2* | 7/2022 | Codevilla | G05D 1/0088 |
| 11,385,642 B2* | 7/2022 | Haggblade | B60W 50/00 |
| 2014/0081893 A1 | 3/2014 | Modha | |
| 2017/0221560 A1 | 8/2017 | Hu et al. | |
| 2018/0225562 A1 | 8/2018 | Van Der | |
| 2019/0057314 A1 | 2/2019 | Julian et al. | |
| 2019/0138894 A1 | 5/2019 | Yakopcic et al. | |
| 2019/0279366 A1 | 9/2019 | Sick et al. | |
| 2019/0324205 A1* | 10/2019 | Sharma | G02B 6/12019 |
| 2019/0387185 A1* | 12/2019 | Hicks | G06V 10/143 |
| 2019/0391251 A1 | 12/2019 | Bharadwaj, Jr. et al. | |
| 2020/0175315 A1 | 6/2020 | Gowaikar et al. | |
| 2020/0209864 A1 | 7/2020 | Chen | |
| 2020/0326718 A1 | 10/2020 | Kandemir et al. | |
| 2021/0133541 A1 | 5/2021 | Vasanthakumaribabu et al. | |
| 2021/0190913 A1 | 6/2021 | Vasanthakumaribabu et al. | |
| 2021/0215753 A1* | 7/2021 | Price | G01R 31/2831 |
| 2021/0326687 A1 | 10/2021 | Liu et al. | |
| 2021/0381960 A1* | 12/2021 | Na | G01S 7/4914 |
| 2022/0026540 A1* | 1/2022 | Olivier | G01S 7/4817 |
| 2022/0026573 A1* | 1/2022 | Baribault | G02F 1/291 |
| 2022/0026576 A1* | 1/2022 | Baribault | G01S 7/4817 |

FOREIGN PATENT DOCUMENTS

| | | | | |
|---|---|---|---|---|
| JP | 2019531489 | * | 10/2016 | |
| WO | WO-2017037453 A1 | * | 3/2017 | G01D 5/35361 |
| WO | WO-2021138358 A1 | * | 7/2021 | |

OTHER PUBLICATIONS

Xia, qianfei, Memristive crossbar arrays for brain-inspired computing 2019 (Year: 2019).*

Chantelle Dubois, "What Is Solid State LiDAR and Is It Faster, Cheaper, Better?", https://www.allaboutcircuits.com/news/solid-state-lidar-faster-cheaper-better/, 2018.

Gennadi Bersuker, et al.: "Metal Oxide RRAM Switching Mechanism Based on Conductive Filament Properties", Journal of Applied Physics 110(12):124518, Dec. 2012.

Lidar, Wikipedia, printed on Oct. 31, 2019.

Philip E. Ross, "Lumotive Says It's Got a Solid-State Lidar That Really Works", IEEE Spectrum, https://spectrum.ieee.org/cars-that-think/transportation/sensors/lumotive-says-its-got-a-solidstate-lidar-that-really-works, Mar. 21, 2019.

Tianqi Tang, et al.: "Spiking Neural Network with RRAM: Can We Use it for Real-World Application?", 2015 Design, Automation, and Test in Europe Conference & Exhibition, pp. 860-865, 2015.

Shin, Sangho, et al., "Memristor-Based Fine Resolution Programmable Resistance and Its Applications." IEEE, 2009.

* cited by examiner

INTELLIGENT LIDAR SENSORS FOR AUTONOMOUS VEHICLES

FIELD OF THE TECHNOLOGY

At least some embodiments disclosed herein relate to lidar sensors in general and more particularly, but not limited to, lidar sensors for autonomous vehicles.

BACKGROUND

Recent developments in the technological area of autonomous driving allow a computing system to operate, at least under some conditions, control elements of a motor vehicle without the assistance from a human operator of the vehicle.

For example, sensors (e.g., cameras, radars, and/or lidars) can be installed on a motor vehicle to detect the conditions of the surroundings of the vehicle traveling on a roadway. A computing system installed on the vehicle analyzes the sensor inputs to identify the conditions and generate control signals or commands for the autonomous adjustments of the direction and/or speed of the vehicle, with or without any input from a human operator of the vehicle.

In some arrangements, when a computing system recognizes a situation where the computing system may not be able to continue operating the vehicle in a safe manner, the computing system alerts the human operator of the vehicle and requests the human operator to take over the control of the vehicle and drive manually, instead of allowing the computing system to drive the vehicle autonomously.

Autonomous driving and/or Advanced Driver Assistance System (ADAS) can use an Artificial Neural Network (ANN) for the identification of events and/or objects that are captured in sensor inputs. Examples of sensor inputs include images from digital cameras, lidars, radars, ultrasound sonars, etc.

In general, an Artificial Neural Network (ANN) uses a network of neurons to process inputs to the network and to generate outputs from the network.

For example, each neuron in the network receives a set of inputs. Some of the inputs to a neuron may be the outputs of certain neurons in the network; and some of the inputs to a neuron may be the inputs provided to the neural network. The input/output relations among the neurons in the network represent the neuron connectivity in the network.

For example, each neuron can have a bias, an activation function, and a set of synaptic weights for its inputs respectively. The activation function may be in the form of a step function, a linear function, a log-sigmoid function, etc. Different neurons in the network may have different activation functions.

For example, each neuron can generate a weighted sum of its inputs and its bias and then produce an output that is the function of the weighted sum, computed using the activation function of the neuron.

The relations between the input(s) and the output(s) of an ANN in general are defined by an ANN model that includes the data representing the connectivity of the neurons in the network, as well as the bias, activation function, and synaptic weights of each neuron. Using a given ANN model a computing device computes the output(s) of the network from a given set of inputs to the network.

For example, the inputs to an ANN network may be generated based on camera inputs; and the outputs from the ANN network may be the identification of an item, such as an event or an object.

A Spiking Neural Network (SNN) is a type of ANN that closely mimics natural neural networks. An SNN neuron produces a spike as output when the activation level of the neuron is sufficiently high. The activation level of an SNN neuron mimics the membrane potential of a natural neuron. The outputs/spikes of the SNN neurons can change the activation levels of other neurons that receive the outputs. The current activation level of an SNN neuron as a function of time is typically modeled using a differential equation and considered the state of the SNN neuron. Incoming spikes from other neurons can push the activation level of the neuron higher to reach a threshold for spiking. Once the neuron spikes, its activation level is reset. Before the spiking, the activation level of the SNN neuron can decay over time, as controlled by the differential equation. The element of time in the behavior of SNN neurons makes an SNN suitable for processing spatiotemporal data. The connectivity of SNN is often sparse, which is advantageous in reducing computational workload.

In general, an ANN may be trained using a supervised method where the parameters in the ANN are adjusted to minimize or reduce the error between known outputs resulted from respective inputs and computed outputs generated from applying the inputs to the ANN. Examples of supervised learning/training methods include reinforcement learning, and learning with error correction.

Alternatively, or in combination, an ANN may be trained using an unsupervised method where the exact outputs resulted from a given set of inputs is not known before the completion of the training. The ANN can be trained to classify an item into a plurality of categories, or data points into clusters.

Multiple training algorithms can be employed for a sophisticated machine learning/training paradigm.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
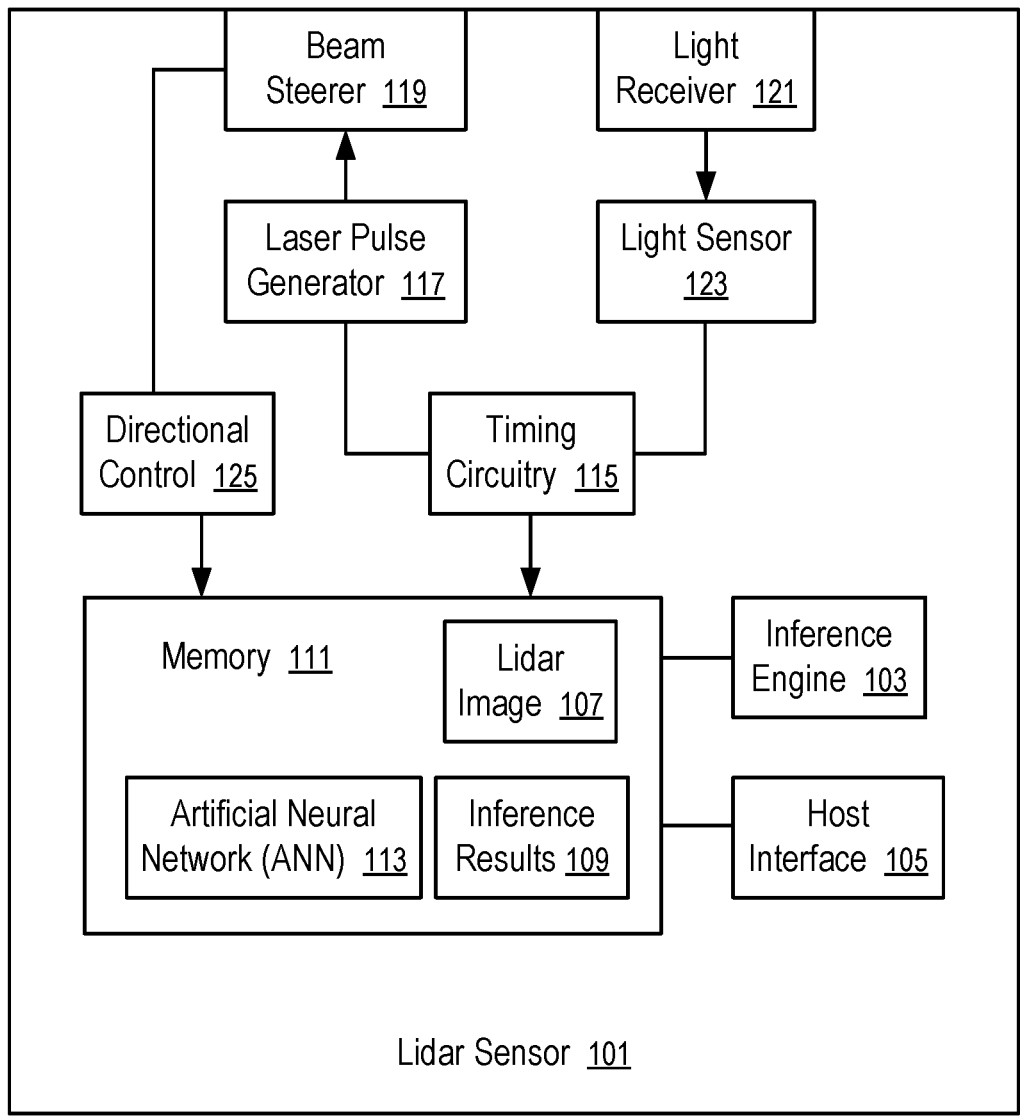
FIG. 1 shows a lidar sensor according to one embodiment.

At least some embodiments disclosed herein provide systems, methods and apparatus of intelligent lidar sensors in a motor vehicle, or another vehicle, with or without an Advanced Driver Assistance System (ADAS).

For example, an Artificial Intelligence (AI) engine implemented using a neuromorphic memory device can be configured in a lidar sensor. The AI engine can analyze the lidar information to generate inference results for the host system (e.g., the ADAS of an autonomous vehicle). For example, the AI engine can process the lidar image, extract a relevant portion of a lidar image, and provide the extracted portion to the ADAS for sensor fusion. For example, the AI engine can process the lidar image to identify characteristics of an object captured in the lidar image and communicate the characteristics to the ADAS for further analysis and/or for adjustment of the control of the vehicle.

A lidar sensor can be used in an autonomous vehicle for obstacle avoidance, lane keeping, blind spot detection, rear collision warning, cross traffic alert, adaptive cruise control, etc. A lidar sensor projects a laser pulse in a direction. When the laser pulse is reflected at a point by an object back to the lidar sensor, the lidar sensor can compute the distance between the point and the lidar sensor based on the speed of light and the time delay between the transmission of the laser pulse and the reception of the reflected laser pulse. The distance identifies the position of the point relative to the lidar sensor in a three-dimensional space surrounding the lidar sensor. By projecting laser pulses in different directions, the lidar sensor can scan the three-dimensional space surrounding the lidar sensor for a set of closest points that can reflect laser points back towards the lidar sensor. The set of closest points surrounding the lidar sensor represents the physical environment of the lidar sensor and objects/obstacles near the lidar sensor. Optionally, the intensity of the reflected laser pulses is also measured. The positions of the set of points, and optionally their intensity of reflected laser pulses, can from a lidar image as observed by the lidar sensor. The lidar image can be in the form of the positions of the reflection points in a three-dimensional space and/or their reflection intensity. Objects/obstacles can be identified from analyzing the lidar image using an artificial neural network.

Instead of providing the lidar image to the ADAS of the vehicle, a lidar sensor can have a neuromorphic memory device to perform an analysis of the lidar image and generate inference results that are provided to the ADAS of the vehicle. The neuromorphic memory device can be used to implement a Deep Neural Network (DNN) or a Spiking Neural Network to analyze the 3-dimensional maps of lidar information (e.g., locations of points of reflections of laser pulses and reflection intensity of the laser pulses from the points of reflections). The analysis results of the DNN or SNN can be sent to the ADAS of the vehicle for sensor fusion, for further analysis, and/or for driving decision making. Such an arrangement can substantially reduce the amount of data to be transferred to, and analyzed by, the processor(s) of the ADAS. For example, when the lidar information is locally converted at the lidar sensor into inference results using the DNN or SNN, the lidar sensor can generate the 3-dimensional maps of lidar information at a resolution and frame rate that exceeds the communication bandwidth supported by a standardized communication line between the lidar sensor and the processor(s) of the ADAS. The improved resolution and frame rate can lead to better and safer autonomous driving capability.

For example, the AI engine can be integrated within the light sensor of a solid-state lidar chip. A solid-state lidar can adjust the direction of transmitting a laser pulse without physically adjusting the orientation of a laser transmitter. For example, a set of optional emitters can send out laser transmissions in specific patterns and phases to create directional emission of a laser pulse. For example, a metasurface with fine-tunable liquid crystals can be controlled to adjust the direction of laser transmission. In some implementations, micro-mirrors are used to apply directional control of laser transmission.

FIG. 1 shows a lidar sensor (101) according to one embodiment.

In FIG. 1, the lidar sensor (101) includes a laser pulse generator (117). Based on the directional control (125), a beam steerer (119) can adjust the direction of the projection of the laser pulse relative to the lidar sensor (101). A light receiver (121) directs the laser pulse, reflected at a point of on the path of the laser pulse transmission, to a light sensor (123). Timing circuitry (115) determines the round-trip time of the laser pulse leaving the laser pulse generator (117) and arriving at the light sensor (123) after being reflected at the point on the path of laser pulse transmission. The directional control (125) identifies the direction of the point; and the timing circuitry (115) measures the distance to the point. Optionally, the light sensor (123) also measure the intensity of the reflection at the point. A lidar image (107) contains attributes of a set of points scanned at different directions. The attributes of each point can include the direction and range of the point relative to the lidar sensor (101) and optionally, the reflection intensity at the point. Each point can be considered a pixel of the lidar image. In some instances, each pixel is in a three-dimensional space, with its reflection intensity as the attribute of the pixel. In other instances, each pixel can be mapped to a plane (e.g., by projection in the direction of laser pulses on a spherical surface), with the range and/or intensity as the attribute of the pixel.

In FIG. 1, the lidar image (107) is stored in memory (111) of the lidar sensor (101) in a cyclic way, where the newest lidar image (107) is written over the oldest lidar image (107). For example, the memory (111) can include integrated circuit memory cells; and the integrated circuit memory cells can be non-volatile memory (e.g., NAND, FERAM, NOR, PCM, MRAM, cross point memory). Further, the memory (111) of the lidar sensor (101) stores an Artificial Neural Network (ANN) (113). An inference engine (103) of the lidar sensor (101) is configured to apply the ANN (113) on the lidar image (107) to generate inference results (109). A host interface (105) is configured to provide the inference results (109) to a host system, such as a computer of a vehicle implementing an ADAS for autonomous driving. When the methods and techniques described therein (e.g., the method of FIG. 11) are implemented at least in part via instructions executed via a programmable device (e.g., the inference engine (103) and/or a controller or processor), the instructions can be stored in the memory (111), or another machine readable media.

Optionally, the memory (111) and/or the inference engine (103) can be formed on an integrated circuit die that is stacked on the integrated circuit die of the light sensor (123). High bandwidth connections can be provided on the integrated circuit die between the memory (111) and the inference engine (103). In some implementations, at least a portion of the inference engine (103) is implemented in a portion of the memory (111). For example, a memristor crossbar array can be used to store the parameters of an ANN (113) and used to compute matrix multiplication and accumulation involving the ANN (113).

For example, the inference result (109) can include the identification of an object captured in the lidar image (107), the location and speed of the object relative to the lidar sensor (101), the size of the object, one or more classification of the object, and/or an extracted portion of the lidar image (107) that shows the object.

The memory (111) can be implemented using integrated circuit memory. In general, some memory integrated circuits are volatile and require power to maintain the stored data; and some memory integrated circuits are non-volatile and can retain the stored data even when not powered. The memory (111) can include volatile memory and/or non-volatile memory. The memory (111) can be implemented using different types of memory or a same type of memory.

Examples of non-volatile memory include flash memory, memory units formed based on negative-and (NAND) logic gates, negative-or (NOR) logic gates, Phase-Change Memory (PCM), magnetic memory (MRAM), resistive random-access memory, cross point storage and memory devices. A cross point memory device can use transistor-less memory elements, each of which has a memory cell and a selector that are stacked together as a column. Memory element columns are connected via two layers of wires running in perpendicular directions, where wires of one layer run in one direction in the layer is located above the memory element columns, and wires of the other layer is in another direction and in the layer located below the memory element columns. Each memory element can be individually selected at a cross point of one wire on each of the two layers. Cross point memory devices are fast and non-volatile and can be used as a unified memory pool for processing and storage. Further examples of non-volatile memory include Read-Only Memory (ROM), Programmable Read-Only Memory (PROM), Erasable Programmable Read-Only Memory (EPROM) and Electronically Erasable Programmable Read-Only Memory (EEPROM) memory, etc. Examples of volatile memory include Dynamic Random-Access Memory (DRAM) and Static Random-Access Memory (SRAM).

The inference engine (103) can include a neural network accelerator configured to perform matrix arithmetic computations more efficiently than a general-purpose processing device (e.g., a controller or a Central Processing Unit (CPU)). Optionally, the inference engine (103) also includes one or more generic processor. The computations involving ANN (113) have matrix arithmetic computations, such as matrix multiplication and accumulation operations, which can be computational intensive for a generic processor. Using the neural network accelerator to perform the matrix arithmetic computations can reduce the data to be transmitted to the processor(s) and reduce the computation workload for the processor(s).

When the ANN (113) includes a Spiking Neural Network (SNN), the simulation of the differential equation(s) for controlling the activation level of SNN neurons can be computationally intensive for a generic processor. Optionally, the neural network accelerator can use special hardware to simulate the differential equation(s) and thus improve the computational efficiency in implementing the SNN.

Figure 2:
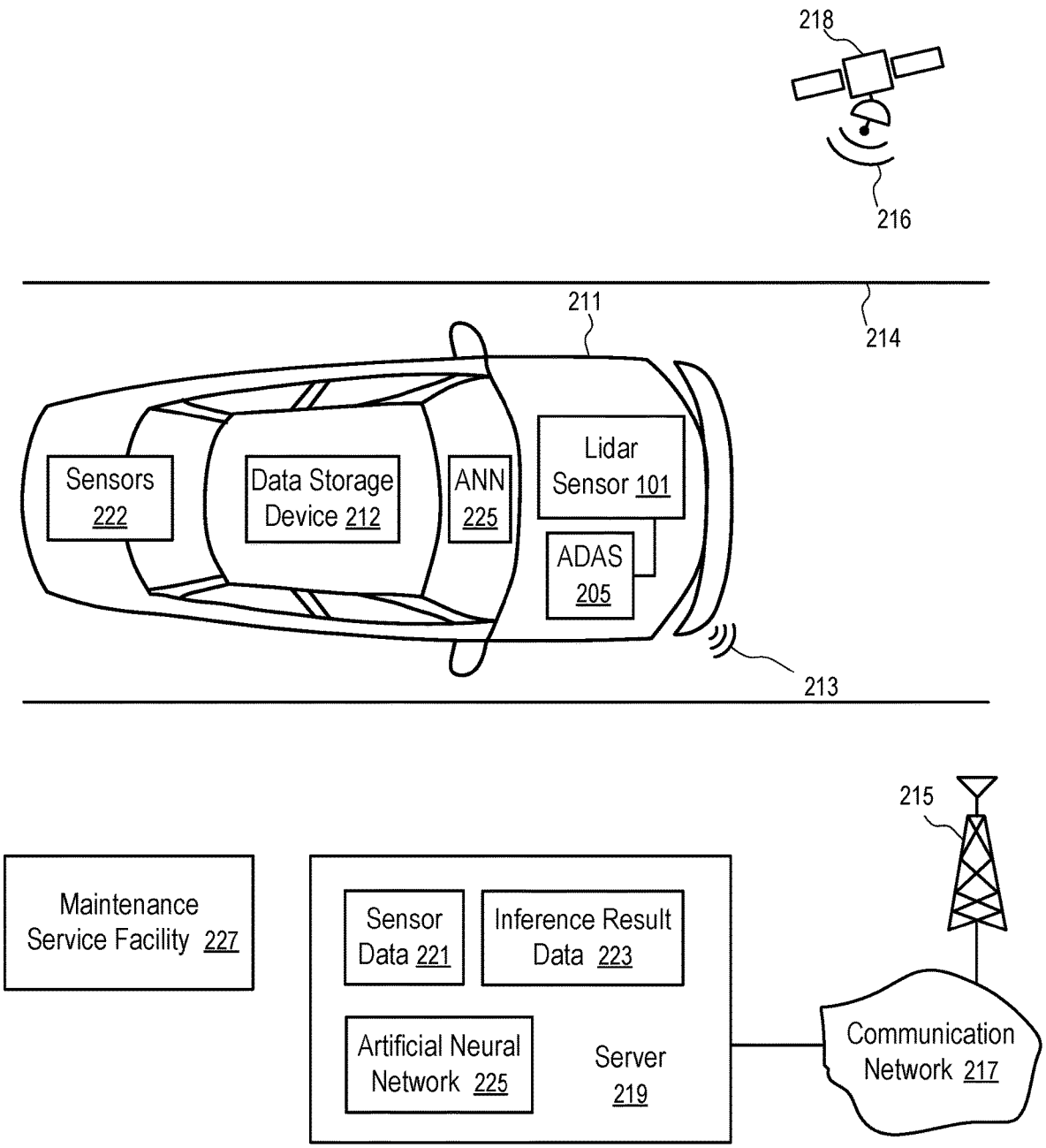
FIG. 2 shows a system having a vehicle configured to collect and process sensor data according to some embodiments.

For example, the lidar sensor (101) can be configured in a vehicle illustrated in FIG. 2.

FIG. 2 shows a system having a vehicle (211) configured to collect and process sensor data according to some embodiments.

The vehicle (211) in FIG. 2 has a lidar sensor (101), a data storage device (212), other sensors (222), an ANN (225), and an ADAS (205) configured to process sensor data, including inputs from the sensors (222), to generate control signals for the vehicle (211).

In general, one or more sensors (e.g., 222, 101) can be configured on the vehicle (211) to generate sensor data input to the ADAS (205) and/or the data storage device (212). The lidar sensor (101), the data storage device (212), and/or the ADAS (205) can be configured to use the ANN (225) to generate inference results. The inference results can include a control signal for operating or driving the vehicle (211), a suggestion for a maintenance service of the vehicle (211), etc.

In some implementations, at least a portion of the data generated by the sensors (e.g., 222, 101) is used in both the ADAS (205) for driver assistance and in the ANN (225) for maintenance prediction. Optionally, the output of the ANN (225) can be used in both the data storage device (212) and in the ADAS (205). The ANN (225) can be part of the ADAS (205).

The sensors (222 and 101) can be configured in a digital camera, lidar, radar, ultrasound sonar, etc. Other types of sensors can also be used, such as brake sensors, speed sensors, acceleration sensors, airbag sensors, a GPS (global positioning system) receiver, audio sensors/microphones, vibration sensors, force/stress sensors, deformation sensors, motion sensors, temperature sensors, etc. Some of the sensors (222 and 101) can be configured primarily to monitor the environment of the vehicle (211); and some of the sensors (222 and 101) can be configured primarily to monitor the operating condition of one or more component of the vehicle (211), such as an internal combustion engine, an exhaust system, an electric motor, a brake, a tire, a battery, etc.

The ANN (225) of the vehicle (211) is configured to process the sensor input data from the sensors (222) and/or the lidar sensor (101) to control the vehicle (211).

In general, the outputs of the sensor(s) (222) and/or the lidar sensor (101) as a function of time are provided as a sensor data stream to the ADAS (205) and/or the ANN (225) to provide driver assistance (e.g., autonomous driving) and maintenance prediction.

At least a portion of the sensor data stream can be provided to the data storage device (212) for storing and/or for processing. For example, a portion of the ANN (225) can be implemented in the data storage device (212). An inference engine of the data storage device (212) can process the sensor data stream to generate inference results for further processing by the ADAS (205). Thus, the input data stream to the data storage device (212) can include at least a portion of the sensor data stream from the sensors (222); and the output data stream from the data storage device (212) can include inference results generated using the ANN (225) in the data storage device (212) for the ADAS (205) of the vehicle (211).

At least a portion of the ANN (225) relevant to the lidar image (107) generated in the lidar sensor (101) can be implemented as the ANN (113) and via the inference engine (103) of the lidar sensor (101). Optionally, some sensor data generated by the sensors (222) and/or inference results generated by the data storage device (212) and/or the ADAS (205) can be provided to the lidar sensor (101) for sensor fusion and/or reduce the data traffic among the communication connections in the vehicle (211).

The ANN (225) of the vehicle (211), in the data storage device (212), and/or in the lidar sensor (101) can include an SNN configured to classify time-based variations of sensor data and/or detect deviation from known patterns of sensor data of the vehicle (211). When the ANN (225) detects the deviation from known patterns, the sensor data corresponding to the deviation can be stored in the data storage device (212) and/or in the memory (111) of the lidar sensor (101) for further analysis and/or for further training of the ANN (225).

The data storage device (212) of the vehicle (211) can be configured to record sensor data for a period of time that can be used in the ANN (225) for predictive maintenance and/or used to further train the ANN (225). The maintenance service facility (e.g., 227) can download the sensor data (221) from the data storage device (212) and provide the sensor data (221) and the corresponding inference result data (223) to the server (219) to facilitate the training of the ANN (225).

Optionally, or in combination, the data storage device (212) and/or the lidar sensor (101) can be configured with a machine learning module to customize and/or train the ANN (225) installed in the vehicle (211) and/or in the data storage device (212).

The vehicle (211) can have a wireless communication device to communicate with a remote server (219) via wireless signals (213) and a communication network (217). The remote server (219) is typically configured at a location away from a road (214) on which the vehicle (211) is in service. For example, the vehicle (211) may provide some sensor data (221) to the server (219) and receive update of the ANN (225) from the server (219).

The communication network (217) can be a cellular phone network having one or more base stations (e.g., 215) to receive the wireless signals (e.g., 213). Alternatively, or in combination, the communication network (217) can include the Internet, where the wireless local area network signals (e.g., 213) transmitted by the vehicle (211) is received in an access point (e.g., 215) for further communication to the server (219). In some implementations, the vehicle (211) uses a communication link (216) to a satellite (218) or a communication balloon to communicate with the server (219).

The server (219) can also communicate with one or more maintenance service facilities (e.g., 227) to receive the sensor data (221) and/or the desired inference result data (223) of vehicles (e.g., 211).

For example, the desired inference result data (223) can be generated by a human operator inspecting the sensor data (221) (e.g., lidar images from the lidar sensor (101), inputs from the sensors (222)) and/or relevant conditions of the vehicle (211). For example, the desired inference result data (223) can include inspection records and/or service records of components of the vehicles (e.g., 211). For example, the inspection records and/or service records can indicate the degree of wear and tear of components inspected during their services at the maintenance service facilities (e.g., 227), the identification of failed or malfunctioning components, etc. The sensor data (221) of the vehicles (e.g., 211) obtained in a time period relevant to the desired inference result data (223) can be used to train an ANN (225) at the server (219) to improve inference capability of the ANN (225).

The updated ANN (225) can be installed in the vehicle (211) at the maintenance service facility (227). Alternatively, the updated ANN (225) can be transmitted to the vehicle (211) to update the vehicle (211) over the air.

A portion of the ANN (225) responsible for the processing of lidar image (107) and/or for sensor fusion based on the lidar image (107) can be configured in the lidar sensor (101). The inference engine (103) of the lidar sensor (101) processes the lidar image (107) and, optionally, inputs from the sensors (222) to generate the inference results (109). Based on the input from the sensors (222) and/or the inference results (109) from the lidar sensor (101), the ADAS (205) of the vehicle (211) can generate controls for autonomous driving of the vehicle (211) and/or driver assistance.

Figure 3:
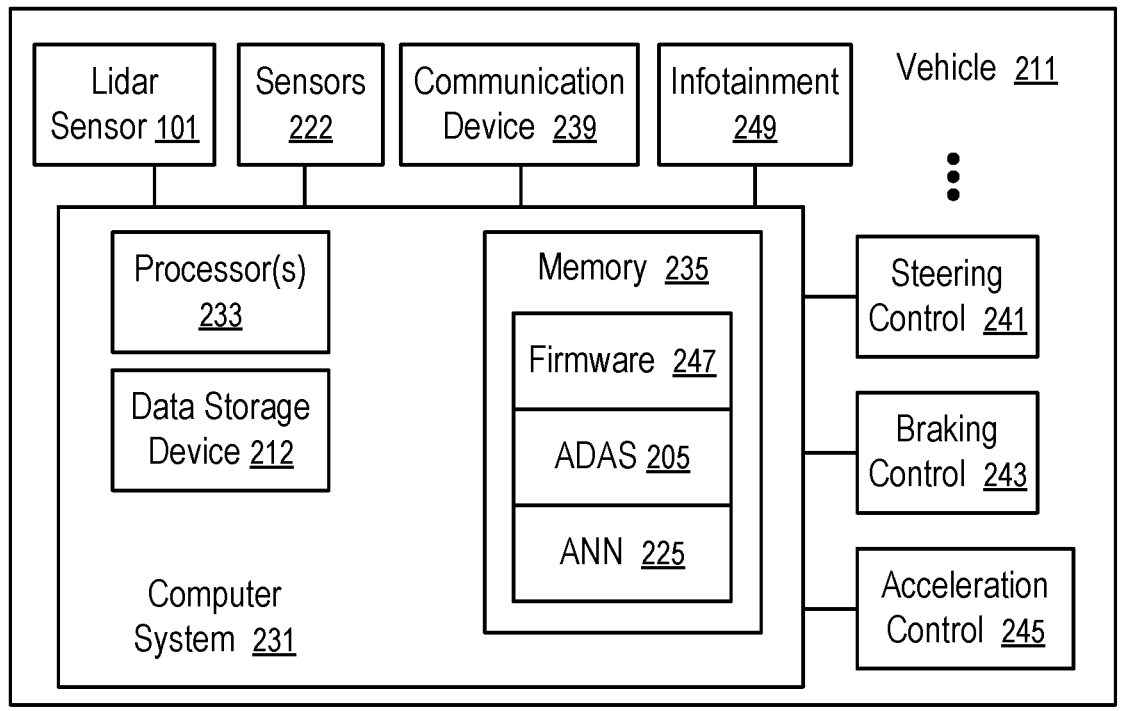
FIG. 3 shows an autonomous vehicle according to one embodiment.

FIG. 3 shows an autonomous vehicle (211) according to one embodiment. For example, the vehicle (211) in the system of FIG. 2 can be implemented using the autonomous vehicle (211) of FIG. 3.

In general, the vehicle (211) can include an infotainment system (249), a communication device (239), a lidar sensor (101), one or more other sensors (222), and a computer system (231) that is connected to some controls of the vehicle (211), such as a steering control (241) for the direction of the vehicle (211), a braking control (243) for stopping of the vehicle (211), an acceleration control (245) for the speed of the vehicle (211), etc. In some embodiments, the vehicle (211) in the system of FIG. 2 has a similar configuration and/or similar components.

The vehicle (211) of FIG. 3 is configured with an Advanced Driver Assistance System (ADAS) (205). The ADAS (205) of the vehicle (211) can have an Artificial Neural Network (ANN) (225) for object detection, recognition, identification, and/or classification, based on images generated in the sensors (222 and 101). A portion of the ANN (225) can be implemented in the lidar sensor (101) of FIG. 1 and/or in the data storage device (212) of FIG. 2.

The computer system (231) of the vehicle (211) can include one or more processors (233), a data storage device (212), and memory (235) storing firmware (or software) (247), including the computer instructions (e.g., instructions (151) described below) and data models for ADAS (205). The computer instructions can include, for example, instructions for causing (via execution by the one or more processors (233)) the various components of the vehicle (211) to perform the methods and techniques described herein, including the method of FIG. 11, described below.

Sensors (222 and 101) of the vehicle (211) can include a visible light camera, an infrared camera, a lidar, radar, or sonar system, a peripheral sensor, a Global Positioning System (GPS) receiver, a satellite positioning system receiver, a brake sensor, and/or an airbag sensor. Further, the sensors (222 and 101) of the vehicle (211) can include audio sensors (e.g., microphone) configured to monitor noises from various components and locations in the vehicle (211), a vibration sensor, a pressure sensor, a force sensor, a stress sensor, and/or a deformation sensor configured to measure loads on a component of the vehicle (211), accelerometers and/or gyroscope sensors measuring the motions of some components of the vehicle (211), etc. Such sensors can be used to monitor the operating status and/or health of the components for predictive maintenance.

The sensors (222) and the lidar sensor (101) can provide a stream of real time sensor data to the computer system (231). For example, the sensor data generated for the vehicle (211) can include an image that captures an object using a camera that images using lights visible to human eyes, or a camera that images using infrared lights, or a sonar, radar, or LIDAR system. Preferably, at least the lidar image (107) is processed by the inference engine (103) of the lidar sensor (101) to generate inference results as the output data of the lidar sensor (101) and thus reduce the computation workload of and the data traffic to the main computer system (231).

For example, the lidar sensor (101) can generate the lidar image (107) at a resolution and frequency that exceeds the communication bandwidth between the lidar sensor (101) and the computer system (231). However, since the inference engine (103) of the lidar sensor (101) reduces the lidar image (107) to inference results (109) that has a data volume much smaller than the lidar image (107), the inference results (109) can be transmitted from the lidar sensor (101) and the computer system (231) using the limited communication bandwidth between the lidar sensor (101) and the computer system (231).

For example, the lidar image (107) can include clouds of points on surfaces that are closest to the lidar sensor (101) as seen by laser pulses. The ANN (113) can be used to analyze the point clouds to identify objects and/or environment features that having the surfaces. For example, point clouds corresponding to different objects or features can be separated from each other for identification. For example, a set of points on a surface of an object (e.g., another vehicle, a person, a building) can be analyzed for the determination of a category/classification of the object. As the point cloud of the surface of the object changes over a period of time, the speed and travel direction of the object can be determined using the ANN (113). The inference results (109) can include the extracted set of points on the surface of the object, an identification/classification of the object, the speed and travel direction of the object, and orientation of the object, etc.

The infotainment system (249) of the vehicle (211) can be used to present data and/or inference results from the lidar sensor (101). For example, compressed lidar images with reduced resolution and refreshing frequency can be generated in lidar sensor (101) and transmitted to the infotainment system (249) for presentation as objects or obstacles around the vehicle (211). Optionally, the communication device (239) can establish a connection to a mobile device of an occupant of the vehicle (211) to make the presentation.

When the vehicle (211) is configured with an ADAS (205), the outputs of the ADAS (205) can be used to control (e.g., 241, 243, 245) the acceleration of the vehicle (211), the speed of the vehicle (211), and/or the direction of the vehicle (211), during autonomous driving.

The memory capacity of the lidar sensor (101) can be partitioned into different portions for the different types of ANN-related data. The different portions can be separately configured to optimize the access and storage of the corresponding data according to their patterns of usages by the inference engine (103).

The model of the Artificial Neural Network (ANN) (113) can include the parameters specifying the static attributes of individual artificial neurons in the ANN (113) and the neuron connectivity in the ANN (113). The model data of the ANN (113) is static and does not change during the prediction calculation made using the ANN (113). Thus, the usage pattern of the model data is mostly read. However, the model data of the ANN (113) can change when an updated ANN (113) is installed. For example, the vehicle (211) can download an updated ANN (113) from the server (219) to the data storage device (212) of the vehicle (211) to update its prediction capability. The model data of the ANN (113) can also change during or after the training of the ANN (113) using a machine learning technique. It is preferred to configure a separate memory partition or region of the data storage device (212) to store the model data, where the partition or region is operated according to configuration parameters that optimize the memory units for the specific usage patterns of the model data (e.g., mostly read, infrequent update). For example, when the memory units are implemented using a flash memory based on NAND logic gates, the memory units in the ANN model partition/region can be configured to operate in a Multi-Level Cell (MLC) mode, a Triple Level Cell (TLC) mode, or a Quad-Level Cell (QLC) mode, wherein each memory cells stores two, three, or four bits for increased storage capability.

Input data provided to the artificial neurons in the ANN (113) can include external inputs and internal inputs. The external inputs are generated typically by the sensors (e.g., 222 and 101) of the vehicle (211) but not by artificial neurons in the ANN (113). The external inputs can be saved in a cyclic fashion so that the input data of the most recent time period of a predetermined length of driving can be found in the data storage device (212). Thus, it is preferred to configure a separate memory partition or region of the data storage device (212) to store the external input data, where the partition or region is operated according to configuration parameters that optimize the memory units for the storage pattern of the external input data (e.g., enhanced endurance, cyclic overwrite). For example, when the memory units are implemented using a flash memory based on NAND logic gates, the memory units in the ANN input partition/region can be configured to operate in a Single Level Cell (SLC) mode, where each memory cell stores one bit of data for improved endurance in cyclic overwriting operations.

In some implementations, artificial neurons can have state variables that change over time in response to inputs during prediction calculations. For example, the activation level of a spiking neuron can change over time and is considered a dynamic state variable of the spiking neuron. In some implementations, such state variable data of artificial neurons has a similar storage usage pattern as the external input data; and thus, the state variable data can be stored in the partition or region configured for the external input data. In other implementations, the state variable data of artificial neurons is kept in a buffer and stored less frequently than the external inputs; and thus, another partition/region can be configured for storing the dynamic state variable data of artificial neurons.

Output data generated by the artificial neurons in the ANN (113) can be buffered for further access by the inference engine (103) and/or the processor(s) (233) of the computer system (231). The output data can include external outputs and internal outputs. The external inputs are generated by artificial neurons as the output from the ANN (113), such as the results of classifications or predictions made by the ANN (113). The output of the ANN (113) is typically further processed by the processor(s) (233) of the computer system (231). The external inputs may be saved periodically (e.g., in a way similar to the storing of the state variable data). The internal outputs and/or some of the external outputs can be internal inputs to artificial neurons in the ANN (113). In general, it may not be necessary to store the internal outputs from the buffer of the data storage device to the memory components. In some implementations, when the buffer capability of the lidar sensor (101) is insufficient to hold the entire state variable data and/or the internal outputs, the lidar sensor (101) can use a swap partition/region to extend the capacity of the buffer. The swap partition/region can be configured for optimized random access and for improved endurance.

External outputs and/or dynamic states of neurons can be saved in a separate output partition or region, in a cyclic way so that the external output data and/or dynamic states of the neurons can be periodically stored, and the most recent sets of the external outputs and/or dynamic states can be found in the lidar sensor (101). External outputs and/or dynamic states of neurons can be stored selectively, since some of such data can be re-generated by the ANN from the external inputs stored in the input partition or region. Preferably, the output partition or region is configured to store one or more sets of external outputs and/or dynamic states that cannot be created from the external inputs stored in the input partition or region. In storing data in a cyclic way in an input/output partition or region, the oldest stored data sets are erased to make rooms for the most recent data sets. The ANN input/output partition/region can be configured for an optimized sequential write stream for copying data from the buffer of the data storage device into the memory units in the memory components of the data storage device.

Figure 4:
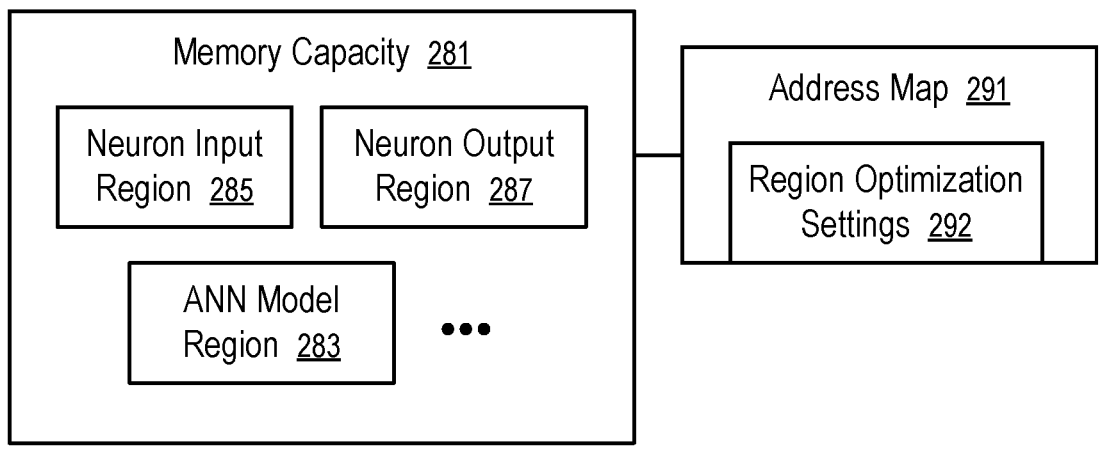
FIG. 4 shows a memory capacity configured to support neural network computations according to one embodiment.

FIG. 4 shows a memory capacity (281) configured to support neural network computations according to one embodiment. For example, the memory capacity (281) of the memory (111) of the lidar sensor (101) of FIG. 1 can be configured according to FIG. 4 to support neural network computations. For example, the memory capacity (281) of the data storage device (212) can be configured according to FIG. 4 to support neural network computations.

The storage capacity (281) of FIG. 4 can be implemented using one or more memory components, each configured in an integrated circuit and/or on an integrated circuit die.

A set of regions (283, 285, 287, . . . ) can be created on the memory capacity (281). Each of the region (e.g., 283, 285, or 287) corresponds to a named portion of the memory capacity (281). Logical addresses are defined within each region. An address map (291) is configured to map between the logical addresses defined in the regions (283, 285, 287, . . . ) to the physical addresses of memory units in the memory components.

The address map (291) can include region optimization settings (292) for the regions (283, 285, and 287).

For example, an ANN model region (283) can be a memory/storage partition configured for the model data of the Artificial Neural Network (ANN) (113). The region optimization settings (292) optimizes the memory operations in the ANN model region (283) according to the data usage pattern of ANN models (e.g., mostly read, infrequent update centric).

For example, a neuron input region (285) can be a memory/storage partition configured for the external input data to the Artificial Neural Network (ANN) (113). The region optimization settings (292) optimizes the memory operations in the neuron input region (285) according to the data usage pattern of the external input data (e.g., for enhanced endurance supporting cyclic overwrite of continuous input data flow for sequential writes).

For example, a neuron output region (287) can be a memory/storage partition configured for the external output data provided from the Artificial Neural Network (ANN) (113). The region optimization settings (292) optimizes the memory operations in the neuron output region (287) according to the data usage pattern of the external output data (e.g., improved endurance for periodically overwrite of data with random read/write access).

A buffer (e.g., 252 in FIG. 5) can be configured to store temporary/intermediate data of the Artificial Neural Network (ANN) (113), such as the internal inputs/outputs of the artificial neurons in the ANN (113).

Figure 5:
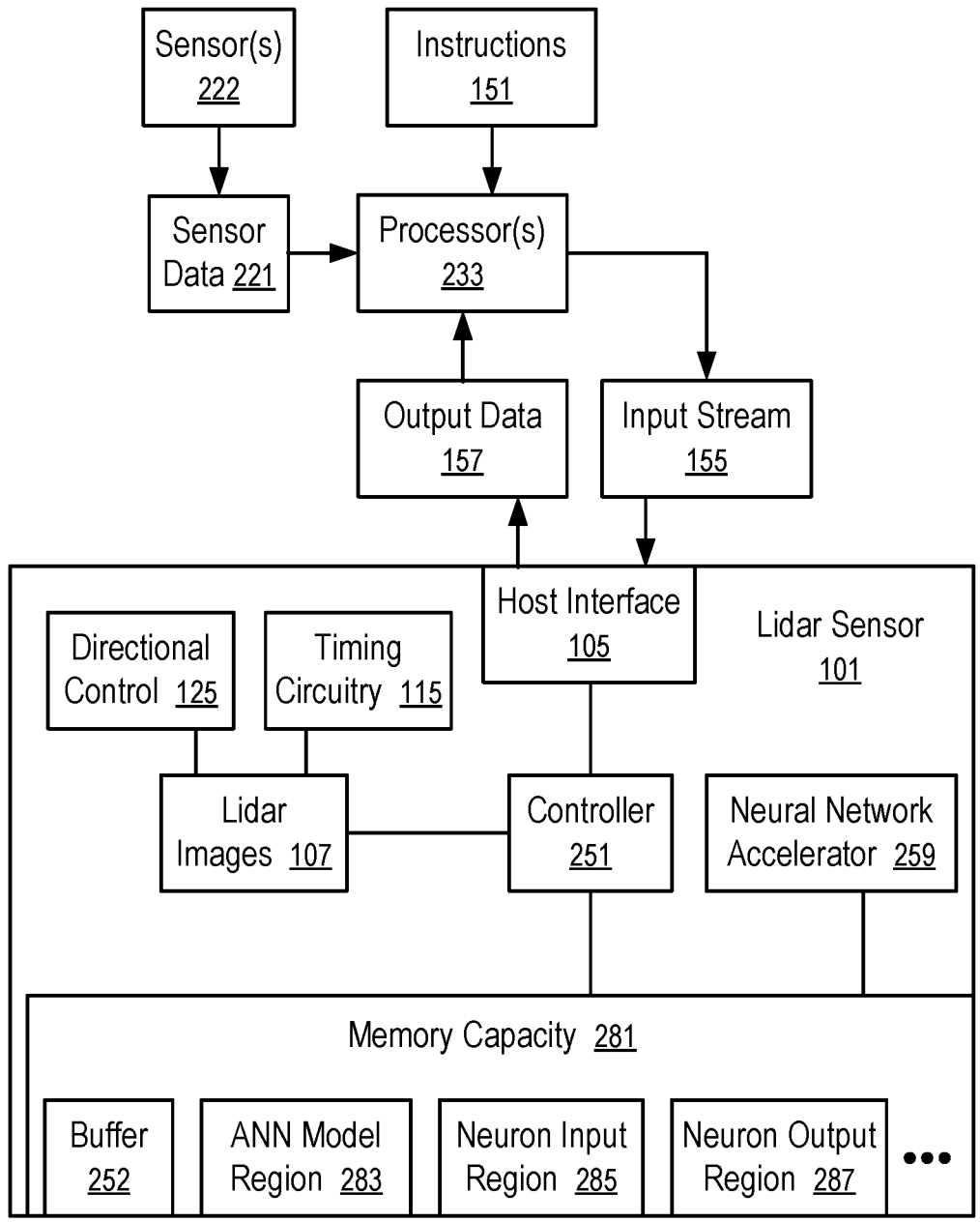
FIG. 5 shows communications between an autonomous vehicle and a lidar sensor according to one embodiment.

Optionally, a swap region can be configured in the memory capacity (281) to extend the capacity of the buffer (e.g., 252 in FIG. 5).

Optionally, the address map (291) includes a mapping between logic memory addresses received in the host interface (105) to access data of artificial neurons and the identities of the artificial neurons. Thus, a read or write command to access one type of data of an artificial neuron in one region can cause the controller (e.g., 251 in FIG. 5) to access another type of data of the artificial neuron in another region.

For example, in response to a request to write external input data for a neuron into the memory capacity (281), the address map (291) can be used to calculate the addresses of the model parameters of the neuron in the ANN model region (283) and read the model parameters into the buffer (252) to allow the inference engine (103) to perform the computation of the output of the neuron. The output of the neuron can be saved in the buffer (252) as the internal input to other neurons (e.g., to reduce write amplification). Further, the identities of the other neurons connected to the neuron can also be retrieved from the ANN model region (283) into the buffer (252), which allows the inference engine (103) and/or the processor to further process the propagation of the output in the ANN (113). The retrieval of the model data from the ANN model region (283) can be performed in parallel with the storing of the external input data into the neuron input region (285). Thus, the processors (233) of the computer system (231) of the vehicle (211) do not have to explicitly send in read commands for the retrieval of the model data from the ANN model region (283).

Similarly, in response to reading output data of a neuron, the address map (291) can be used to compute the addresses of the model parameters of the neuron stored in the ANN model region (283) and read the model parameters into the buffer (252) to allow the inference engine (103) to apply internal inputs in the buffer (252) to the perform the computation of the output of the neuron. The computed output can be provided as a response to the reading of the output data for the neuron, without the lidar sensor (101) having to store the output data in the memory components. Thus, the processors (233) and/or the inference engine (103) can control the computations of the neuron via writing inputs to neurons and/or reading outputs from neurons.

In general, incoming external input data to the ANN (113) can be raw sensor data (221) generated directly by the sensors (e.g., 222 and 101) without processing by the processors (233) and/or the inference engine (103). Alternatively, indirect sensor data (221) that has been processed by the processors (233) for the ANN (113) from the signals from the sensors (222) can be provided as the external input data. The incoming external input data can be accepted in the host interface (105) and written in a cyclic way into the neuron input region (285), and automatically buffered in the buffer (252) for inference engine (103) to generate neuron outputs using the model stored in the ANN model region (283). The outputs generated by the inference engine (103) can be further buffered as internal inputs for further application of the model in the ANN model region (283). When the external outputs become available, the controller (251) can report the completion of the write requests with an indication of the availability of the external outputs. Optionally, the controller 251 and/or the inference engine (103) can generate internal read commands to propagate signals in the ANN (113) in generating the external outputs. Alternatively, the host processors (233) can control the propagation of signals in the ANN (113) by selectively reading outputs of neurons; and the data storage device (212) can actively buffer data that may be needed in the buffer (252) to accelerate the ANN computation.

A communication protocol/interface can be configured to allow lidar sensor to perform neural network acceleration on the fly with reduced data traffic to the host system.

For example, the host processor (e.g., 233) of a vehicle (211) can provide write commands to the lidar sensor (101) to store the model of an artificial neural network in a model partition (e.g., 283).

To use the ANN model in classifications and/or predictions, the host processor (e.g., 233) of a vehicle (211) can optionally stream input data for the ANN (113) into the neuron input partition (e.g., 285). The inference engine (103) can automatically apply the radio images (107) from the tone detector (115) and, if there is any, the input data from the host processor (233) to the model stored in ANN model partition (e.g., 283) in accordance with the address map (291). The lidar sensor (101) makes the computed outputs available for propagation in the ANN (113). Preferably, the computed outputs are made available to the inference engine (103) through the buffer (252) without the need to store the intermediate outputs into memory components. Thus, the data communications between the host processor (e.g., 233) and the lidar sensor (101) for the transporting of outputs of neurons can be reduced. When the outputs have propagated to the output neurons in the ANN (113), the lidar sensor (101) can provide a response to a request from the host processor (e.g., 233). The response indicates that the external output from neurons in the ANN (113) is available. In response, the host processor (e.g., 233) of a vehicle (211) can optionally issue read commands to retrieve the external outputs for further processing.

FIG. 5 shows communications between an autonomous vehicle (211) and a lidar sensor (101) according to one embodiment. For example, the communications as illustrated in FIG. 5 can be implemented in the vehicle (211) of FIG. 2 or 3, with a lidar sensor (101) illustrated in FIG. 1.

In FIG. 5, the processor(s) (233) of the host system (e.g., 231) can be configured with a simplified set of instructions (151) to perform neural network computation, since some of the computations involving the ANN (225) is performed by the inference engine (103) or neural network accelerator (259) within the lidar sensor (101).

The sensors (222) of the vehicle (211) can generate an optional continuous input stream (155) as part of sensor data (221) for lidar sensor (101) of the vehicle (211). The sensor data (221) in the input stream (155) can be generated at a fixed, predetermined time interval (e.g., during the operation of the vehicle (211)) for sensor fusion in the lidar sensor (101). Alternatively, the operations of sensor fusion can be performed by the processors (233).

The timing circuitry (115) and the directional control (125) can provide data to form a stream of lidar images (107). The lidar images (107) and the optional input stream (155) are applied to input neurons in the ANN (113) stored in the ANN model region (283). Input neurons in the ANN (113) are configured to accept external inputs to the ANN (113); and output neurons are configured to provide external outputs from the ANN (113).

The processor(s) (233) can execute the instructions (151) to process some of the sensor data (221) and the output data (157) from the neuron output region (287) of the lidar sensor (101).

For example, the processor(s) (233) can write the sensor data (221) as part of the input stream (155) into the neuron input region (285) and read from the neuron output region (287) the output data (157) generated by the inference engine (103) using the ANN data in the model region (283).

The lidar sensor (101) stores the input stream (155) into the neuron input region (285) in a cyclic way where the oldest input set corresponding to the oldest time instance of data sampling for data sets currently stored in the neuron input region (285) is erased to store the newest set of inputs.

For each input data set, the inference engine (103) applies the model of the ANN (113) stored in the ANN model region (283). The inference engine (103) (or the processor(s) (233)) can control the propagation of signals within the neural network. When the output neurons of the ANN (113) generate their outputs responsive to the input data set, the lidar sensor (101) can provide to the processor (233) an indication that the neuron outputs are ready for retrieval. The indication can be configured in a response to the request from the processor(s) (233) to write the input data set into the neuron input region (285). The processor(s) (233) can optionally retrieve the output data (157) (e.g., in accordance with conditions and/or criteria programmed in the instructions).

In some embodiments, a trigger parameter is configured in the lidar sensor (101). When an output parameter in the external output (167) meets a requirement specified by the trigger parameter, the lidar sensor (101) provides the response to the request from the processor(s) (233) to write the input data set into the neuron input region (285).

Figure 6:
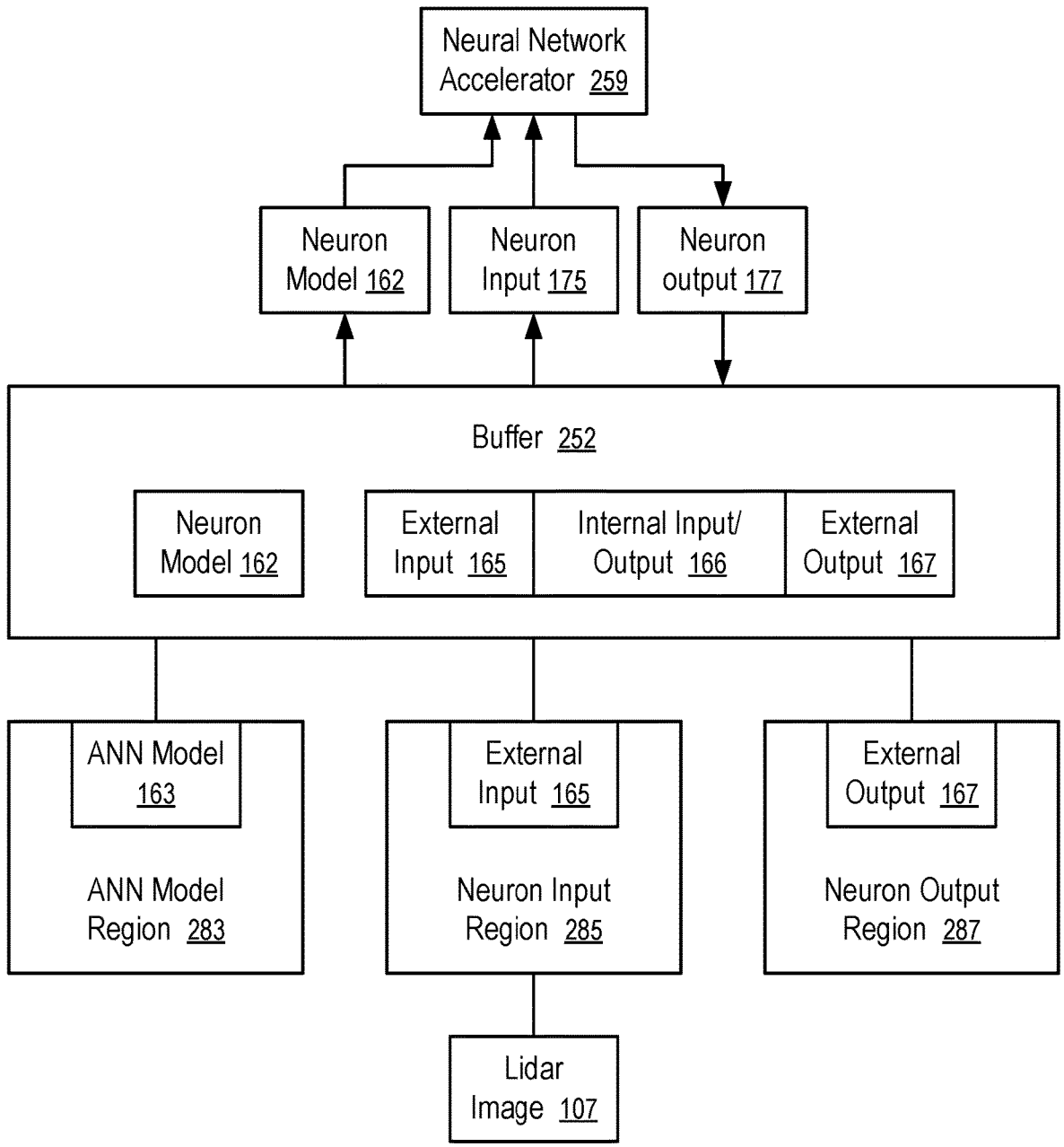
FIG. 6 shows communications within a lidar sensor according to one embodiment.

FIG. 6 shows communications within a lidar sensor (101) according to one embodiment. For example, the communications of FIG. 6 can be implemented in a lidar sensor (101) illustrated in FIG. 1.

In FIG. 6, the model region (283) stores the model (163) of an ANN (113). In response to receiving the lidar images (107) and an optional set of external input (165) for a time instance from the input stream (155) in the buffer (252), the data storage device (212) can write the external input (165) into the input region (285) in parallel with retrieving a neuron model (162) containing a portion of the ANN model (163) corresponding to the parameters of the input neurons and/or the identities of neurons connected to the input neurons. The buffer (252) allows the inference engine (103) to combine the neuron model (162), the lidar image (107), and the optional external input (175) to generate the output (177) of the input neurons.

In general, the neuron output (177) can include a portion that is the internal output (166) for further propagation within the ANN (113) and/or a portion that is the external output (167) for the processor(s) (233).

The internal output (166) is stored in the buffer (252) as internal input (166) for further propagation in the ANN (113) in a way similar to the generation of neuron outputs (177) from the external input (165). For example, a portion of the internal input (166) can cause the controller (251) and/or the inference engine (103) to retrieve corresponding neuron model (162) relevant to the internal input such that the internal input is applied in the inference engine (103) to the corresponding neuron model (162) to generate their neuron outputs (177).

When the complete set of the external output (167) is available in the buffer (252), the external output (167) can be stored into the output region (287).

Optionally, the lidar sensor (101) (or the storage device (212)) does not store each set of external output (167) corresponding to a set of stored external input (165) sampled at a time instance. For example, the lidar sensor (101) (or the storage device (212)) can be configured to store one set of external output (167) every time when a predetermined number of sets of external input (e.g., 165) has been counted. Alternatively, or in combination, the processor(s) (233) can determine whether or not to store the external output (167). For example, the lidar sensor (101) can be configured to store the external output (167) in response to the processor(s) (233) retrieving the external output (167) for further processing. For example, the lidar sensor (101) (or the storage device (212)) can be configured to store the external output (167) in response to a write command from the processor(s) (233) after the processing of the external output (167) in the processor(s) (233).

The inference engine (103) and/or the neural network accelerator (259) can be configured to implement and/or accelerate a spiking neural network using one or more memristor crossbar arrays.

Resistive Random-Access Memory (ReRAM or RRAM) works by changing the resistance across a dielectric solid-state material, which can be referred to as a memristor. In general, a memristor is a two-terminal electrical component that has a non-constant electrical resistance. Its resistance can change based on the history of current flowing through the memristor and/or the history of voltage applied on the memristor. The memristor can remember its recent resistance when the power supply to the memristor is turned off. Thus, the memristor can be used to implement non-volatile memory.

A crossbar array of memristors can be configured to perform the Multiply-and-Accumulate (MAC) operations via analog circuitry. Electric currents going through the wordlines through a set of memristors in the crossbar array to a bitline are summed in the bitline, which corresponds to the accumulation operation. The electric currents correspond to the multiplication of the voltages applied on the wordlines and parameters associated with the resistances of the memristors, which corresponds to the multiplication operations. The current in the bitline can be compared with a spiking threshold to determine whether the activation level of a neuron represented by the bitline has reached a spiking level. An array of memristors can be connected to the bitlines respectively and programmed to have thresholds corresponding to the activation level thresholds of spiking neurons. A current detector can be configured for each memristor connected to the output of a bitline to determine whether the level of electric current in the bitline corresponding to a level that exceeds the threshold of the memristor. The detection result of the current detector can represent the spiking response in the output of a spiking neuron represented by the bitline. The spiking response can be routed to a further portion of the SNN or to an output of the SNN.

Alternatively, Analog-to-Digital Converters (ADCs) can be used to measure and convert the electric currents in the bitlines into digital data for spiking detection in a comparator. However, ADCs consume more space and energy than memristors and current detectors. Thus, the use of the array of memristors and current detectors in detecting spiking to eliminate the need for ADCs can improve the space and energy efficiency of the SNN implementation.

Figure 7:
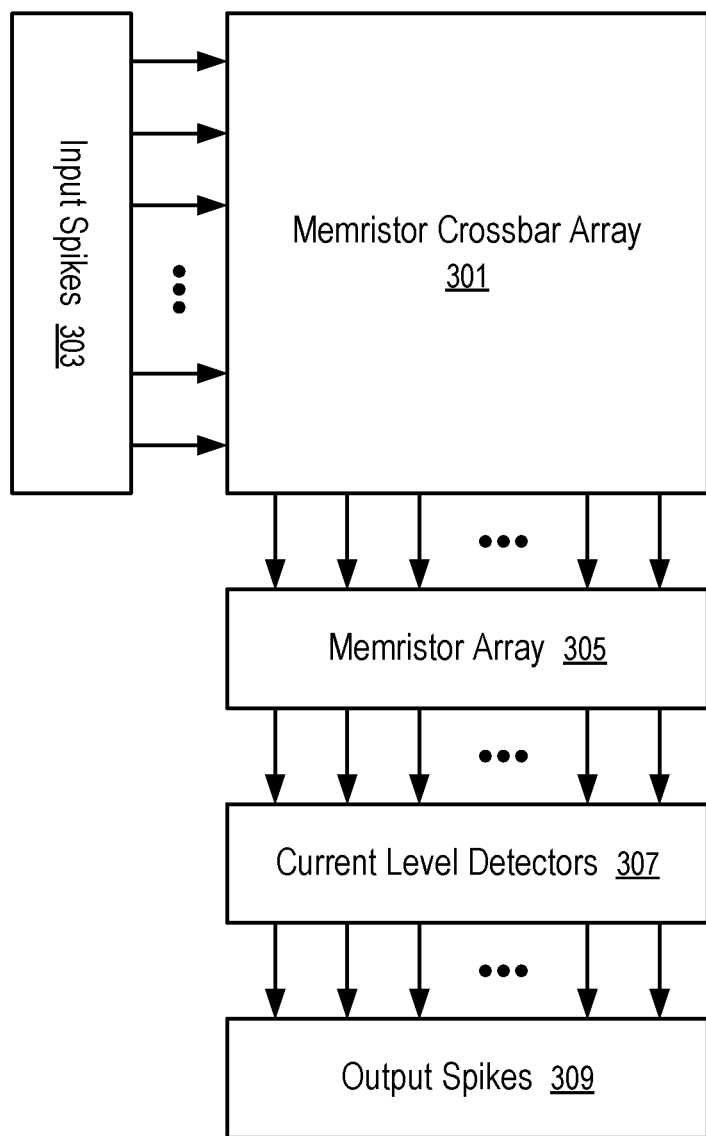
FIG. 7 shows a tile of spiking neural network implemented in a lidar sensor using memristors according to one embodiment.

FIG. 7 shows a tile of spiking neural network implemented using memristors according to one embodiment.

In FIG. 7, a memristor crossbar array (301) receives input voltage spikes (303) to generate electric currents going through the memristor array (305) that can function as an array of switches. Each memristor in the array (305) is programmed to have a threshold for spiking detection. When the electric current flowing through the memristor is lower than the threshold, the memristor has a substantially same electrical resistance; and the switch implemented via the memristor is considered to be in an off state. However, when the electric current flowing through the memristor reaches its threshold, the electrical resistance of the memristor drops (e.g., close to zero), causing the current flowing through the memristor to increase significantly and spike; and in such a situation, the switch implemented via the memristor is considered to be in an on state. Once the switch implemented via the memristor is in the on state, the current flowing through the memristor can increase to at least a predefined level that is independent of the threshold of the memristor and that is higher than the currents that can flow through the memristors in the array (301) before reaching the thresholds of the memristors in the array (301).

An array of current level detectors (307) can be configured to detect whether currents flowing through the memristors in the array (305) have reached the levels corresponding to the switch-on state of the memristors in the array (305). The detection can be performed based on detecting whether at least the predefined level of current is flowing through the corresponding memristors in the array (305). Thus, the current detection operations of the current level detectors (307) are independent on the thresholds of the memristors in the array (305). Based on whether or not at least the predefined level of current is present in a memristor in the array, a corresponding detector in the array of current level detectors (307) generates a digital signal indicating whether a spike in electric current is detected for a memristor in the array (305). The collection of the outputs from the current level detectors (307) provides the output spikes (309).

Figure 8:
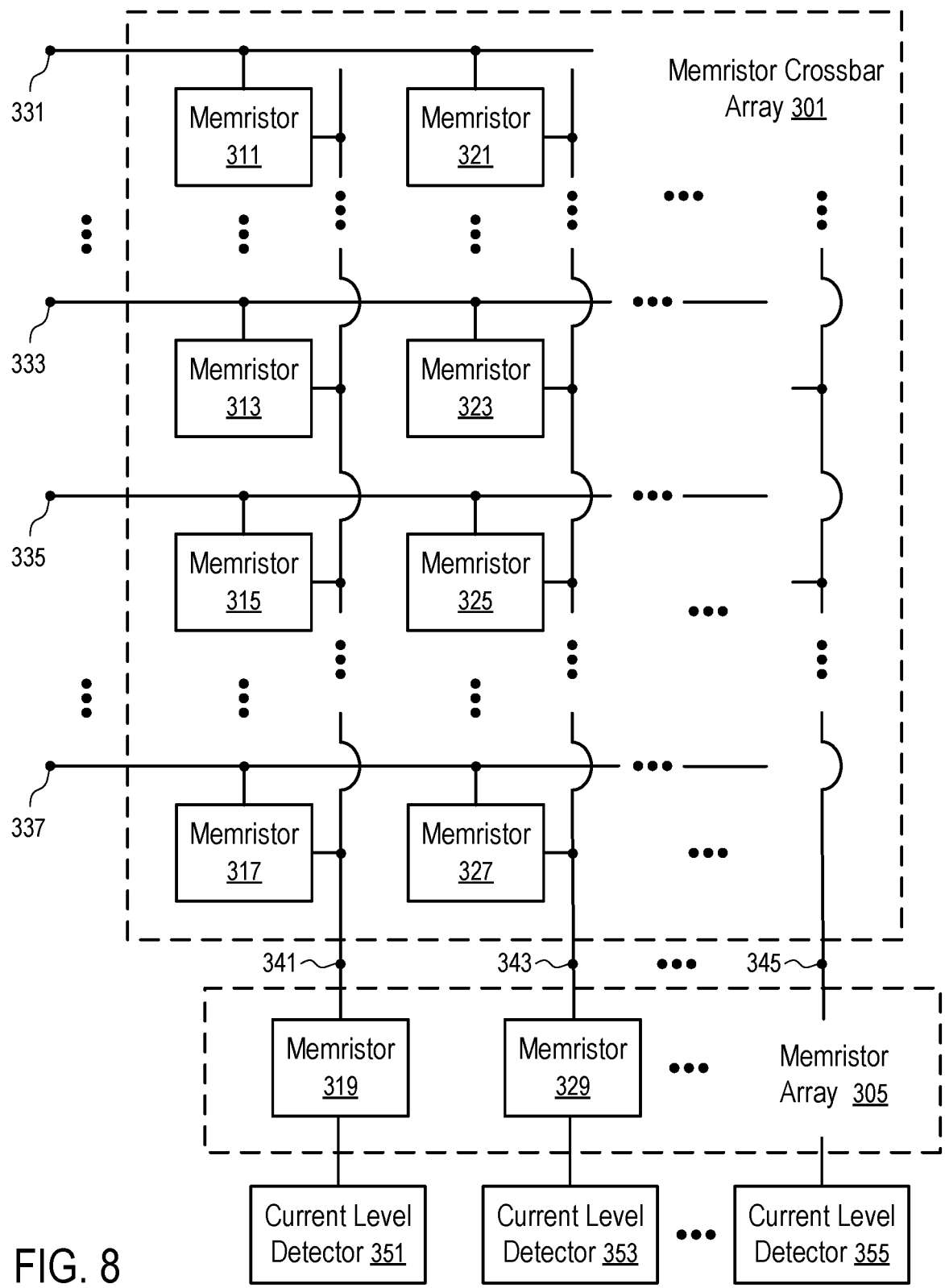
FIG. 8 illustrates the use of current spikes through a memristor array to detect spiking in a spiking neural network implemented using memristors according to one embodiment.

FIG. 8 illustrates the use of current spikes through a memristor array to detect spiking in a spiking neural network implemented using memristors according to one embodiment. For example, the crossbar array (301) and the memristor array (305) of FIG. 7 can be implemented in a way as illustrated in FIG. 8.

In FIG. 8, each of the memristors in the crossbar array (301) are connected between a wordline (e.g., 331) and a bitline (e.g., 341). The wordlines (331, . . . , 333, 335, . . . , 337) are configured to receive input voltages; the bitlines (341, 343, . . . , 345) are configured to provide output currents; and the memristor array (305) is configured to generate, according to activation level thresholds of spiking neurons, output current spikes corresponding to the spiking of neurons represented by the bitlines (341, 343, . . . , 345).

For example, when a voltage is applied on the wordline (331), the voltage generates currents flowing to the bitlines (341, 343, . . . , 345) through the memristors (311, 321, . . . ) respectively. The contributions from the voltage applied on the wordline (331) to the currents in the bitlines (341, 343, . . . , 345) are proportional to weights and responses of neurons to the input represented by the voltage applied on the wordline (331). The weights and responses of neurons can be implemented via programming the resistances of the memristors (311, 321, . . . ) respectively.

The bitlines (341, 343, . . . , 345) sum the electric currents contributed from the voltages applied on the wordlines (331, . . . , 333, 335, . . . , 337) to the bitlines (341, 343, . . . , 345). Thus, the currents in the bitlines (341, 343, . . . , 345) correspond to the summation of the multiplications of the weights and responses of neurons, implemented via the programmed resistances of the crossbar array (301), with the voltages of the wordlines (331, . . . , 333, 335, . . . , 337) that represent the input to the neurons.

For example, the contributions of the voltages on the wordlines (331, . . . , 333, 335, . . . , 337) to the bitline (341)

are summed via the currents flowing from the wordlines (331, ..., 333, 335, ..., 337) through the memristors (311, ..., 313, 315, ..., 317) to the bitline (341); and the contributions of the voltages on the wordlines (331, ..., 333, 335, ..., 337) to the bitline (343) are summed via the currents flowing from the wordlines (331, ..., 333, 335, ..., 337) through the memristors (321, ..., 323, 325, ..., 327) to the bitline (343); etc.

Thus, the crossbar array (301) performs Multiply-and-Accumulate (MAC) operations by converting the voltages on the wordlines (331, ..., 333, 335, ..., 337) to the currents on bitlines (341, 343, ..., 345).

In FIG. 8, instead of using ADCs to measure the currents flowing through the bitlines (341, 343, ..., 345), a memristor array (305) is used to generate current spikes based on thresholds of memristors (319, 329, ...) that are connected to the bitlines (341, 343, ...) respectively.

For example, a memristor (319) is connected to the bitline (341) and programmed to have a threshold corresponding to the threshold of activation level of a spiking neuron. When the current on the bitline (341) is less than the current threshold, the memristor (319) has a first resistance corresponding to a switch-off state; and when the current on the bitline (341) has reached the current threshold, the memristor (319) has a second resistance corresponding to a switch-off state, which is significantly lower than the first resistance.

A current level detector (351) is configured to detect whether or not the current on the bitline (341) is at a level corresponding to the switch-on state of the memristor (319), which indicates whether or not a spike is produced by a spiking neuron corresponding to the bitline (341).

Thus, the outputs of the current level detectors (351, 353, ..., 355) correspond to the output spikes (309) of the bitlines (341, 343, ..., 345).

For example, a spike train can be applied on the wordline (331). The spike train is a time sequence of the voltages applied on the wordline (331). Voltages in the spike train can be scheduled at a fixed time interval. The voltages in the spike train can be selected from two predetermined voltages. One of the voltages corresponds to the presence of a spike at a time instance in the spike train; and the other corresponds to the absence of a spike at a time instance in the spike train.

For example, a data item containing a number of bits can be converted into a spike train on the same number of time instances. The voltage applied at each of the time instances is based on the value of the corresponding bit in the data item.

When a set of spike trains are applied to the set of wordlines (331, ..., 333, 335, ..., 337) respectively, the outputs of the current level detectors (351, 353, ..., 355) generate a set of output spike trains, which can be further processed by another tile of spiking neural network.

The resistance values of the memristors in the crossbar array (301) can be set to model the behavior of a spiking neural network. The resistance values of the memristors in the crossbar array (301) can be changed via programming the memristors by selectively applying currents and/or voltages. For example, after a memristor (e.g., 311) is selected for programming, a voltage applied on the memristor (e.g., 311) can be raised to place the memristor (e.g., 311) in a switch-on state; and then programming pulses can be applied on the memristor (e.g., 311) to adjust the resistance of the memristor (e.g., 311) to a desired value. After the programming, the memristor (e.g., 311) remembers its programmed resistance during its switch-off state, until the memristor (e.g., 311) is again selected for programming under the switch-on state. A separate circuit can be used to select memristor (e.g., 311) and program the resistance of the memristor (e.g., 311).

Figure 9:
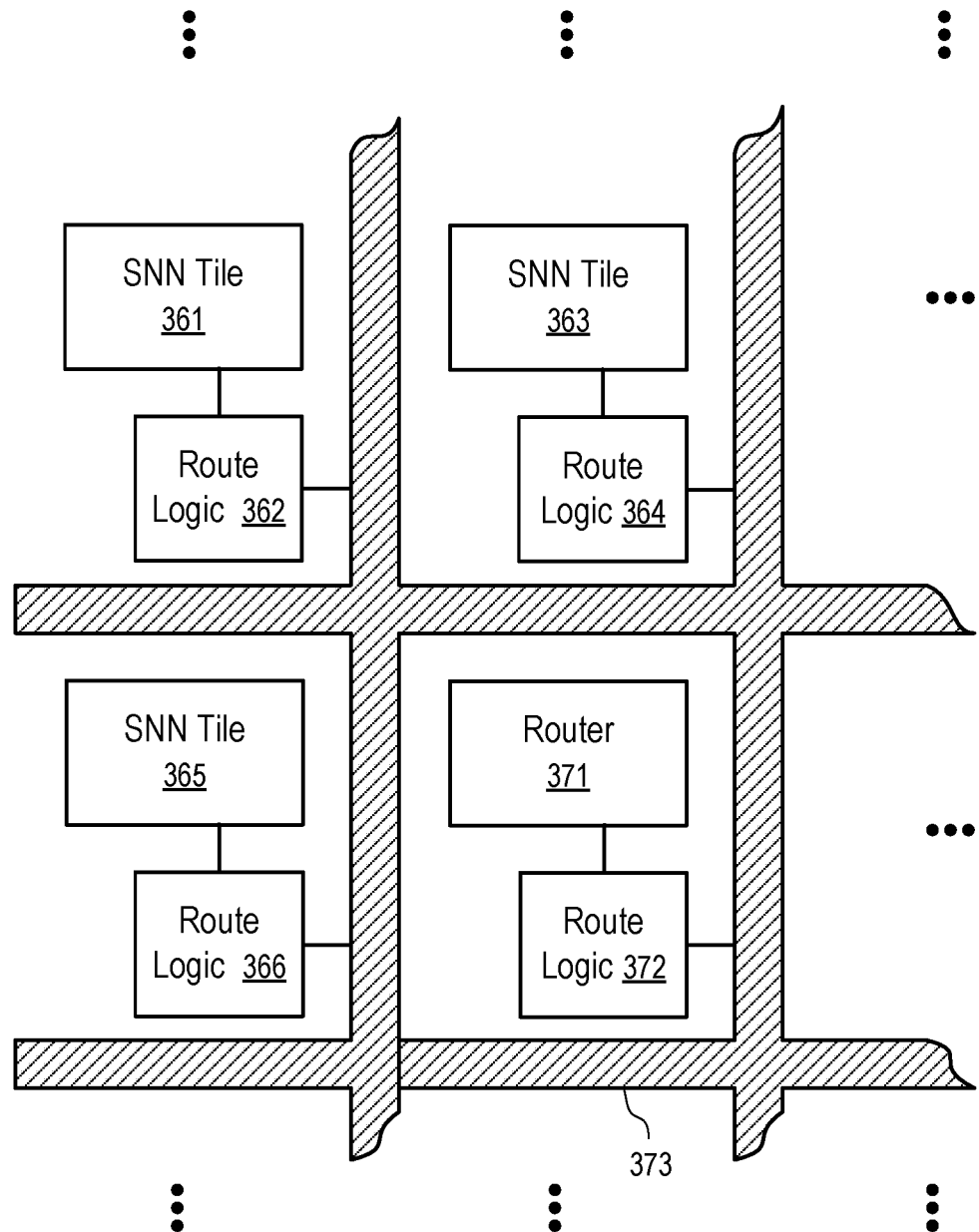
FIG. 9 illustrates a spiking neural network implemented using a network of spiking neural network tiles according to one embodiment.

FIG. 9 illustrates a spiking neural network implemented using a network of spiking neural network tiles according to one embodiment.

In FIG. 9, a plurality of SNN tiles (361, 363, 365, ...) are configured on an integrated circuit die. Each SNN tile (e.g., 361, 363, or 365) can be implemented in a way illustrated in FIG. 7 and/or FIG. 8. Each SNN tile (e.g., 361, 363, or 365) has an associated route logic (e.g., 362, 364, or 366) configured to provide input spike data (e.g., 303) from a communication network (373) to the SNN tile and transmit its output spike data (e.g., 309) via the communication network (373) to other SNN tiles.

For example, each SNN tile (e.g., 361, 363, or 365) and the router (371) can have a unique address for the data transmission over the communication network (373). An input spike train address to an SNN tile (e.g., 361) is received by the its route logic (e.g., 362), which generates respective voltages for the wordlines (e.g., 331, ..., 333, 335, ..., 337) of the tile (e.g., 301) to cause the tile (e.g., 301) to generate output spikes (309) via the current level detectors (e.g., 351, 353, ..., 355) connected to the bitlines (e.g., 341, 343, ..., 345) of the SNN tile (e.g., 301). The route logic (e.g., 362) then transmits the output spikes to the router (371). The router (371) is configured to route the output spikes to the next tile(s) (e.g., 363, and/or 365) according to the neural connectivity in the spiking neural network.

The router (371) is configured on the integrated circuit die to route the input/output spikes to or from the SNN tiles (e.g., 361, 363, and/or 365) (e.g., according to a routing table configured according to the neural connectivity in a spiking neural network). Thus, the SNN tiles (e.g., 361, 363, or 365) on the integrated circuit die can be re-configured via the router (371) to model different spiking neural networks of different neuron connectivity configurations.

Figure 10:
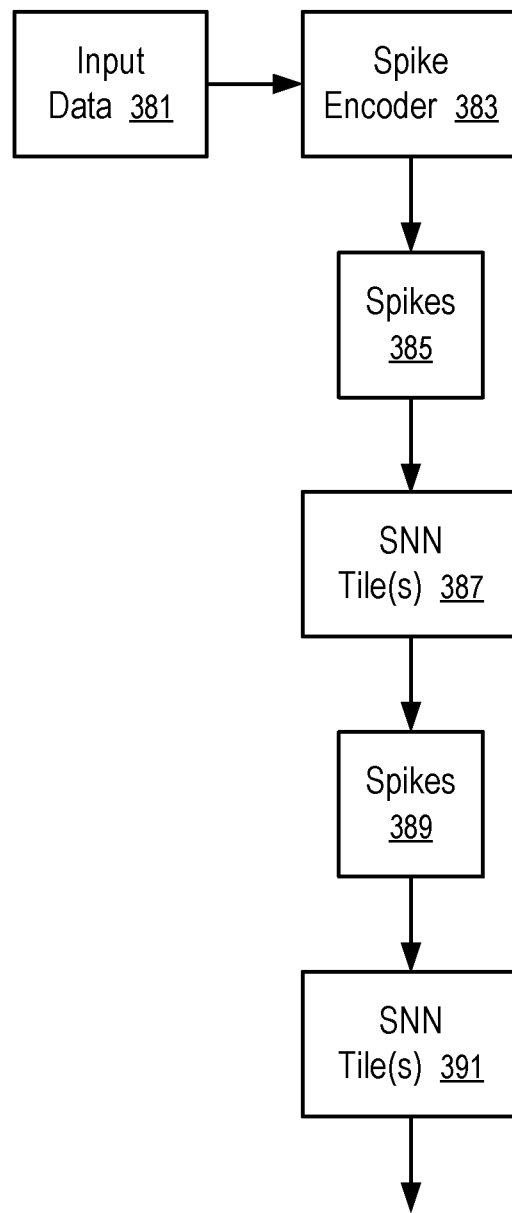
FIG. 10 illustrates the processing of a spiking neural network by detecting spikes using memristors and routing the detected spikes among memristor tiles.

FIG. 10 illustrates the processing of a spiking neural network by detecting spikes using memristors and routing the detected spikes among memristor tiles.

In FIG. 10, input data (381) to a spiking neural network is converted by a spike encoder (383) to generate spikes (385) as inputs to one or more SNN tiles (387). Each of the SNN tiles (387) can be implemented in a way illustrated in FIG. 7 or FIG. 8, where the output spikes in electronic currents in the bitlines (e.g., 341, 343, ..., 345) are detected via an array (305) of memristors having thresholds configured according to the thresholds of the activation levels of spiking neurons. The current level detectors (351, 353, ..., 355) generate digital data of output spikes (309) that can be provided as input spikes (389) to further SNN tile(s) (391). Further layers of SNN tiles can be added in a way similar to the use of the second layer of tiles (391).

The tiles (e.g., 387 and 391) used in FIG. 10 can be the tiles (361, 363, 365, ...) configured on an integrated circuit die. Some of the tiles (361, 363, 365, ...) on the integrated circuit die can be reconfigured to model different portions of spiking neurons in a network at different times.

For example, the first layer of SNN tiles (387) can be initially configured on the tiles (361, 363, 365) by programming the resistance of the memristors (e.g., 311 to 317, 321 to 327, ...) in the crossbar array (301) of each tile (e.g., 301) and by programming the thresholds of the memristors (e.g., 319, 329, ...) for spike detection. Subsequently, some of the tiles (361, 363, 365) can be reprogrammed as the SNN tiles (391) for the second layer processing.

Figure 11:
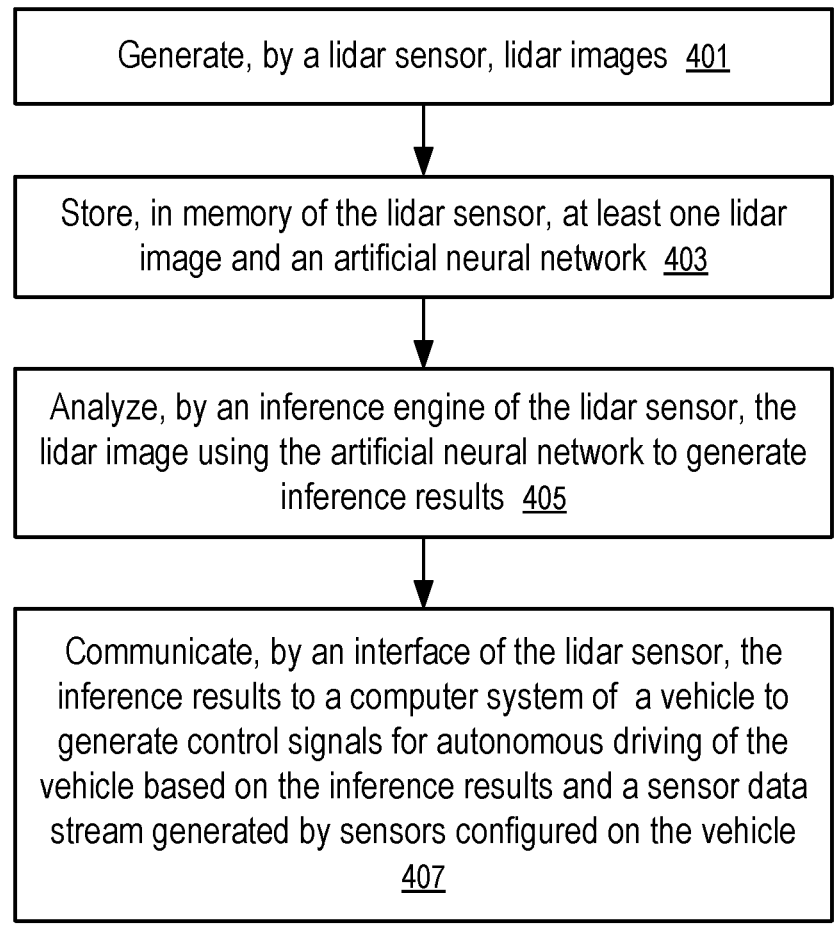
FIG. 11 shows a method of a lidar sensor according to one embodiment.

FIG. 11 shows a method of a lidar sensor according to one embodiment. For example, the method of FIG. 11 can be implemented in a lidar sensor (101) of FIG. 1 or in a vehicle (211) of FIG. 2 or 3.

At block 401, a lidar sensor (101) generates lidar images (107).

For example, the lidar sensor (101) can include a laser pulse generator (117), a directional control (125), and a beam steerer (119) coupled to the laser pulse generator (117) and the directional control (125) to project laser pulses in different directions. The lidar sensor (101) can include a light sensor (123) and a light receiver (121) configured to direct laser pulses reflected back to the lidar sensor (101) to the light sensor (123). Timing circuitry of the lidar sensor (101) is configured to determine a time gap between a laser pulse projected by the beam steerer (119) at a direction and the laser pulse reflected back to the light sensor (123).

Memory (111) of the lidar sensor (101) is configured to store at least one lidar image (107) and an artificial neural network (113). The lidar image (107) represents the surrounding of the lidar sensor (101) as seen via laser pulses. For example, the lidar image (107) identifies, based on inputs from the directional control (125) and the timing circuitry (115), attributes of a plurality of points that reflect later pulses back to the light sensor (123), such as the direction to the points, the range to the points, the locations of the points, the intensity of reflected laser pulses, etc.

For example, the beam steerer can be a solid-state device having no movable mechanical components. Alternatively, the beam steerer can be implemented via micro-mirrors.

For example, the memory (111) and the inference engine (103) can be configured on at least one first integrated circuit die; and the light sensor (123) can be configured on a second integrated circuit die. The at least one first integrated circuit die and the second integrated circuit die can be stacked and enclosed within a same integrated circuit package to provide high communication bandwidth among the memory (111) and the inference engine (103). For example, the memory (111) and the inference engine (103) in the at least one first integrated circuit die and the light sensor (123) in the second integrated circuit die can be connected via at least through-silicon vias.

At block 403, at least one lidar image (107) and an artificial neural network (113) for the processing of the lidar image (107) are stored in memory (111) of the lidar sensor (101).

For example, the artificial neural network (113) can include a spiking neural network, or a deep neural network, or any combination thereof.

At block 405, an inference engine (103) of the lidar sensor (101) analyzes the lidar image (107) using the artificial neural network (113) to generate inference results (109).

For example, the lidar sensor (101) can include a host interface (105) configured to provide the inference results (109) to a computer system (231) of a vehicle (211); and, since the lidar sensor (101) is configured to provide the inference results (109), instead of the lidar images (107), the lidar sensor (101) can be configured to generate lidar images (107) at a rate and resolution that exceeds a communication bandwidth between the host interface (105) and the computer system of the vehicle (211).

For example, the lidar image (107) can be analyzed to determine an identification or a classification of an object captured in the lidar image (107).

For example, the lidar image (107) can be analyzed by the ANN (113) to extract a portion showing the object and removing other portions to reduce the amount of image data to be further analyzed for sensor fusion.

For example, a portion of the sensor data stream (221) can be provided as an input stream to the lidar sensor (101); and the inference engine (103) uses the ANN (113) to perform sensor fusion by combining the lidar image (107), or a portion of it showing the captured object, and the portion of the sensor data stream (221) to generate the inference results (109).

Optionally, the analysis of the lidar image (107) by the inference engine (103) can include matrix multiplication and accumulation operations performed using a memristor crossbar array (301). The memristors in the crossbar array (301) are configured to store parameters of the artificial neural network (113).

At block 407, an interface (105) of the lidar sensor (101) communicates the inference results (109) to a computer system (231) of a vehicle (211) to generate control signals for autonomous driving of the vehicle (211) based on the inference results (109) and a sensor data stream (221) generated by sensors (222) configured on the vehicle (211).

For example, the ANN (113) can include a Spiking Neural Network (SNN) implemented using a crossbar array (301) of first memristors (311 to 317; 321 to 327, . . . ). Each of the first memristors is connected between a wordline (e.g., 331, . . . , 333, 335, . . . , or 337) and a bitline (e.g., 341, 343, . . . , or 345) to convert a voltage applied on the wordline into a current in the bitline; and each respective bitline (e.g., 341) of the crossbar array (301) sums currents converted by a column (e.g., 311 to 317) of the first memristors to the respective bitline (e.g., 341).

Further, the SNN is implemented using second memristors (319, 329, . . . ) connected to bitlines (341, 343, . . . ) of the crossbar array (301) respectively. Each of the second memristors (319, 329, . . . ) is programmed to have a threshold for current according to an activation level threshold of a spiking neuron. Thus, spiking of the neuron can be detected by detecting a high current level (e.g., above a predetermined level) that is higher than the thresholds of the second memristors (319, 329, . . . ).

Optionally, the inference engine (103) includes a neural network accelerator (259) implemented using a memristor crossbar array (301). The memristor crossbar array is configured to perform matrix multiplication and accumulation operations by converting voltages on wordlines (331, . . . , 333, 335, . . . , 337) of the crossbar array (301) into currents summed in bitlines (341, 343, . . . , 345) of the crossbar array (301). The memristors (311 to 317; 321 to 327; . . . ) in the crossbar array (301) are configured to store parameters of the artificial neural network (113); and the electrical resistances of the memristors (311 to 317; 321 to 327; . . . ) are programmed according to the parameters of the artificial neural network (113).

In general, the server (219), the computer system (231), the data storage device (212), and the lidar sensor (101) can each be implemented as one or more data processing systems.

The present disclosure includes methods and apparatuses which perform the methods described above, including data processing systems which perform these methods, and computer readable media containing instructions which when executed on data processing systems cause the systems to perform these methods.

A typical data processing system may include an interconnect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random-access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine-readable medium can be used to store software and data which when executed by a data processing system (e.g., a computer system (231) in a vehicle (211), a server (219), a system having processor(s) (233), a device (101) having an inference engine (103) and/or a controller (251)) causes the system to perform various methods. The executable software and data may be stored in various places including for example ROM, volatile RAM, non-volatile memory and/or cache (e.g., memory (111), memory (235), data storage device (212), buffer (252)). Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine-readable medium in entirety at a particular instance of time.

Examples of computer-readable media include but are not limited to non-transitory, recordable and non-recordable type media such as volatile and non-volatile memory devices, Read Only Memory (ROM), Random Access Memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine-readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A lidar sensor, comprising:
   a laser pulse generator;
   a directional control;
   a beam steerer coupled to the laser pulse generator and the directional control to project laser pulses in different directions;
   a light sensor;
   a light receiver configured to direct, to the light sensor, laser pulses reflected back to the lidar sensor;
   timing circuitry configured to determine a time gap between a respective laser pulse projected by the beam steerer and the respective laser pulse reflected back to the light sensor;
   memory configured to store a lidar image and an artificial neural network, wherein the lidar image identifies, based on inputs from the directional control and the timing circuitry, attributes of a plurality of points that reflect laser pulses back to the light sensor;
   an inference engine configured to use the artificial neural network to analyze the lidar image and generate inference results; and
   a host interface configured to provide the inference results to a computer system of a vehicle;
   wherein the memory and the inference engine are configured on at least one first integrated circuit die; and the light sensor is configured on a second integrated circuit die;
   wherein the at least one first integrated circuit die and the second integrated circuit die are enclosed within a same integrated circuit package;
   wherein the memory and the inference engine in the at least one first integrated circuit die and the light sensor in the second integrated circuit die are connected via at least through-silicon vias;
   wherein the memory includes a first predefined region configured to store a model of the artificial neural network, a second predefined region configured to receive neuron inputs, and a third predefined region configured to store neuron outputs;
   wherein generation of the neuron outputs in the third predefined region is configured according to the model in response to the lidar image being written into the second predefined region;
   wherein the inference engine includes a memristor crossbar array configured to perform matrix multiplication and accumulation operations; and
   wherein memristors in the crossbar array are configured to store parameters of the artificial neural network; and the multiplication and accumulation operations are performed by the memristors converting voltages on wordlines of the crossbar array into currents summed in bitlines of the crossbar array.

2. The lidar sensor of claim 1, wherein the beam steerer is a solid-state device having no movable mechanical components.

3. The lidar sensor of claim 2, wherein the artificial neural network includes a spiking neural network, or a deep neural network, or any combination thereof.

4. The lidar sensor of claim 2, wherein the lidar sensor is configured to generate lidar images at a rate and resolution that exceeds a communication bandwidth between the host interface and the computer system of the vehicle.

5. The lidar sensor of claim 2, wherein the attributes include reflection intensity of the points, range to the points, and direction to the points.

6. A vehicle, comprising:
   a plurality of controls for steering, braking, and acceleration;
   a set of sensors configured to generate a sensor data stream;
   a lidar sensor comprising:
      a generator of lidar images;
      a memory configured to store a lidar image and an artificial neural network;
      an inference engine configured to use the artificial neural network to analyze the lidar image and generate inference results; and
      a communication interface;
   a computer system coupled to the communication interface to implement an advanced driver assistance system to operate the controls according to the inference results and the sensor data stream;
   wherein the memory includes a first predefined region configured to store a model of the artificial neural network, a second predefined region configured to receive neuron inputs, and a third predefined region configured to store neuron outputs;
   wherein generation of the neuron outputs in the third predefined region is configured according to the model in response to the lidar image being written into the second predefined region;
   wherein the inference engine includes a memristor crossbar array configured to perform matrix multiplication and accumulation operations; and
   wherein memristors in the crossbar array are configured to store parameters of the artificial neural network; and the multiplication and accumulation operations are performed by the memristors converting voltages on wordlines of the crossbar array into currents summed in bitlines of the crossbar array.

7. The vehicle of claim 6, wherein the inference results identify an object that reflects lidar signals in the lidar image.

8. The vehicle of claim 7, wherein the inference results include a portion extracted from the lidar image using the artificial neural network and a control signal for operating or driving the vehicle.

9. The vehicle of claim 6, wherein a portion of the sensor data stream is provided to the lidar sensor to implement sensor fusion based on the lidar image and the portion of the sensor data stream.

10. The vehicle of claim 6, wherein the inference engine includes a memristor crossbar array configured to store parameters of the artificial neural network and to perform matrix multiplication and accumulation operations in the artificial neural network.

11. A method, comprising:
   generating, by a lidar sensor, lidar images;
   storing, in memory of the lidar sensor, at least one lidar image and an artificial neural network, wherein the memory includes a first predefined region configured to store a model of the artificial neural network, a second predefined region configured to receive neuron inputs, and a third predefined region configured to store neuron outputs, and wherein generation of the neuron outputs in the third predefined region is configured according to the model in response to the lidar image being written into the second predefined region;

analyzing, by an inference engine of the lidar sensor, the lidar image using the artificial neural network to generate inference results, wherein the inference engine includes a memristor crossbar array configured to perform matrix multiplication and accumulation operations, and wherein memristors in the crossbar array are configured to store parameters of the artificial neural network; and the multiplication and accumulation operations are performed by the memristors converting voltages on wordlines of the crossbar array into currents summed in bitlines of the crossbar array; and communicating, by an interface of the lidar sensor, the inference results to a computer system of a vehicle, wherein the computer system is configured to generate control signals for autonomous driving of the vehicle based on the inference results and a sensor data stream generated by sensors configured on the vehicle.

12. The method of claim 11, wherein the analyzing includes determining an identification or a classification of an object captured in the lidar image.

13. The method of claim 12, wherein the analyzing includes extracting, from the lidar image, a portion showing the object.

14. The method of claim 13, further comprising:

receiving, in the lidar sensor, a portion of the sensor data stream; and performing sensor fusion operations, by the inference engine using the artificial neural network, based on the lidar image and the portion of the sensor data stream to generate the inference results.

15. The method of claim 11, wherein the analyzing includes performing matrix multiplication and accumulation operations using a memristor crossbar array configured to store parameters of the artificial neural network.

16. The vehicle of claim 6, wherein the memory and the inference engine are configured on at least one first integrated circuit die; and the lidar sensor includes a light sensor configured on a second integrated circuit die.

17. The vehicle of claim 16, wherein the at least one first integrated circuit die and the second integrated circuit die are enclosed within a same integrated circuit package.

18. The vehicle of claim 17, wherein the memory and the inference engine in the at least one first integrated circuit die and the light sensor in the second integrated circuit die are connected via at least through-silicon vias.

19. The vehicle of claim 18, wherein the memory and the inference engine are configured on at least one first integrated circuit die; and the light sensor is configured on a second integrated circuit die.

20. The method of claim 11, wherein the memory and the inference engine are configured on at least one first integrated circuit die; the lidar sensor includes a light sensor configured on a second integrated circuit die; the at least one first integrated circuit die and the second integrated circuit die are enclosed within a same integrated circuit package; and wherein the memory and the inference engine in the at least one first integrated circuit die and the light sensor in the second integrated circuit die are connected via at least through-silicon vias.

* * * * *